United States Patent [19]

Suzuki et al.

[11] Patent Number: 4,588,934
[45] Date of Patent: May 13, 1986

[54] AUTOMOBILE FAN CONTROL WITH NON-PERIODIC FLUCTUATION SIGNAL GENERATOR

[75] Inventors: Yasuhiko Suzuki, Nagoya; Hideaki Ito, Aichi, both of Japan

[73] Assignee: Kabushiki Kaisha Toyota Chuo Kenkyusho, Aichi, Japan

[21] Appl. No.: 662,618

[22] Filed: Oct. 19, 1984

Related U.S. Application Data

[63] Continuation of Ser. No. 452,767, Dec. 23, 1982, abandoned.

[30] Foreign Application Priority Data

Dec. 26, 1981 [JP] Japan ................. 56-213594

[51] Int. Cl.[4] .................. H02P 7/06; H02P 7/29
[52] U.S. Cl. ..................... 318/449; 318/128;
318/129; 318/268; 318/301; 318/305; 318/444
[58] Field of Search ............... 318/59, 66, 129, 130,
318/268, 301, 305, 443, 444, 449, 126, 127, 128

[56] References Cited

U.S. PATENT DOCUMENTS 3,241,023  3/1966  Eby ................... 318/314
4,218,749  8/1980  Babaud et al. ........ 364/717
4,495,560  1/1985  Sugimoto ............. 364/154

Primary Examiner—William M. Shoop, Jr.
Assistant Examiner—Bentsu Ro
Attorney, Agent, or Firm—Oblon, Fisher, Spivak, McClelland & Maier

[57] ABSTRACT

An automobile fan controller comprises: a fluctuation signal generator for generating a fluctuation signal; a pulse-width-modulation circuit including a triangle generator for generating a triangle-waveform signal having a constant amplitude and a constant period, and a comparator connected to the fluctuation signal generator and the triangle generator, for comparing the fluctuation signal with the triangle-waveform signal, thereby producing a pulse signal having a pulse width variable dependent on the fluctuation signal; and a driver circuit, including a switching power transistor connected to the pulse-width-modulation circuit, a fan motor mounted on an automobile, and an air flow switching unit mounted on the automobile for energizing and de-energizing said fan motor with a variable pulse width in response to the pulse signal. In this fan controller air flow delivered from an automobile fan driven by the fan motor can fluctuate at a fluctuation amplitude in response to an air flow range set by an automobile driver by connecting the automobile fan controller to the fan motor.

8 Claims, 9 Drawing Figures

AUTOMOBILE FAN CONTROL WITH NON-PERIODIC FLUCTUATION SIGNAL GENERATOR

This application is a continuation of U.S. patent application Ser. No. 452,767 filed on Dec. 23, 1982 (now abandoned), this application is copending with U.S patent application Ser. No. 666,148 which is a continuation-in-part of U.S. patent application Ser. No. 452,767.

BACKGROUND OF THE INVENTION

1. Field of the Invention

The present invention relates to an antomobile fan controller which can be connected to a conventional automobile fan capable of changing air flow levels stepwise for fluctuating air delivered from the the automobile fan in flow at each of the air flow levels.

2. Description of the Prior Art

Most of ordinary prior automobile fans are designed to continuously deliver air at a preset constant flow level until the driver changes the flow level setting.

There has recently been proposed an automobile fan capable of fluctuating the air flow randomly regardless of or dependent on the setting the driver has established.

However, there has not yet been proposed a fan controller that can simply be connected to an existing ordinary fan for fluctuating the flow of air delivered from the fan.

SUMMARY OF THE INVENTION

Applicant's invention is directed to a novel fan control system for automobiles which provide for a randomly fluctuating air flow from the automobile's fan motor. The random fluctuation allows for greater comfort to the driver to the automobile, in that human beings are more accustomed to random air flows, such as occurs outdoors, as opposed to a constant air flow. Prior art conventional automobile fan controllers have provided the driver with the option of air flow being either off, low, middle or high with these settings providing a constant flow at the selected level. Accordingly, the automobile driver becomes accustomed to constant air flow almost immediately, without the necessary random fluctuations which make the driver feel more comfortable. Human beings are sensitive to random air flow fluctuations and are more comfortable when the level of air flow is random. Applicants' invention provides a controller system for automobile fans which provides the driver the comfortable feeling provided in natural air flows by providing a randomly fluctuating air flow from a conventional fan.

It is an object of the present invention to provide an automobile fan controller which can produce a comfortable air flow.

It is another object of the present invention to provide an automobile fan controller which can produce a fluctuating flow of air from the fan simply by being connected to an ordinary fan mounted on the automobile.

It is a further object of the present invention to provide an automobile fan controller which adds this function to the ordinary fan.

An automobile fan controller according to the present invention comprises: a random fluctuation signal generator for generating a random fluctuation signal; a pulse-width-modulation circuit including a triangle generator for generating a triangle-waveform signal having a constant amplitude and a constant period, and a comparator connected to the random fluctuation signal generator and the triangle generator, for comparing the random fluctuation signal with the triangle-waveform signal, thereby producing a pulse signal having a pulse width variable dependent on the random fluctuation signal; and a driver circuit, including a switching power transistor connected to the pulse-width-modulation circuit, a fan motor mounted on an antombile, and an air flow switching unit mounted on the automobile for energizing and de-energizing the fan motor with a variable pulse width in response to the pulse signal. In this fan controller, the flow quantity of air (hereinafter referred to as air flow) delivered from an automobile fan driven by the fan motor can randomly fluctuate at a random fluctuation amplitude in response to an air flow range set by an automobile driver by connecting the automobile fan controller to the fan motor.

The present invention may be embodied in the following arrangement. The automobile fan controller includes a range detector connected to the air flow switching unit for detecting the range set by the driver and producing a corresponding range signal, and a subtractor for subtracting the random fluctuation signal from the range signal to generate a difference signal, the comparator being capable of comparing the difference signal with the triangle-waveform signal, the driver being connected to said fan motor, whereby air flow delivered from the automobile fan can fluctuate at a constant fluctuation period regardless of the air flow range set by the driver.

DETAILED DESCRIPTION

The present invention will now be described with reference to the drawings which show embodiments of the invention.

Figure 1:
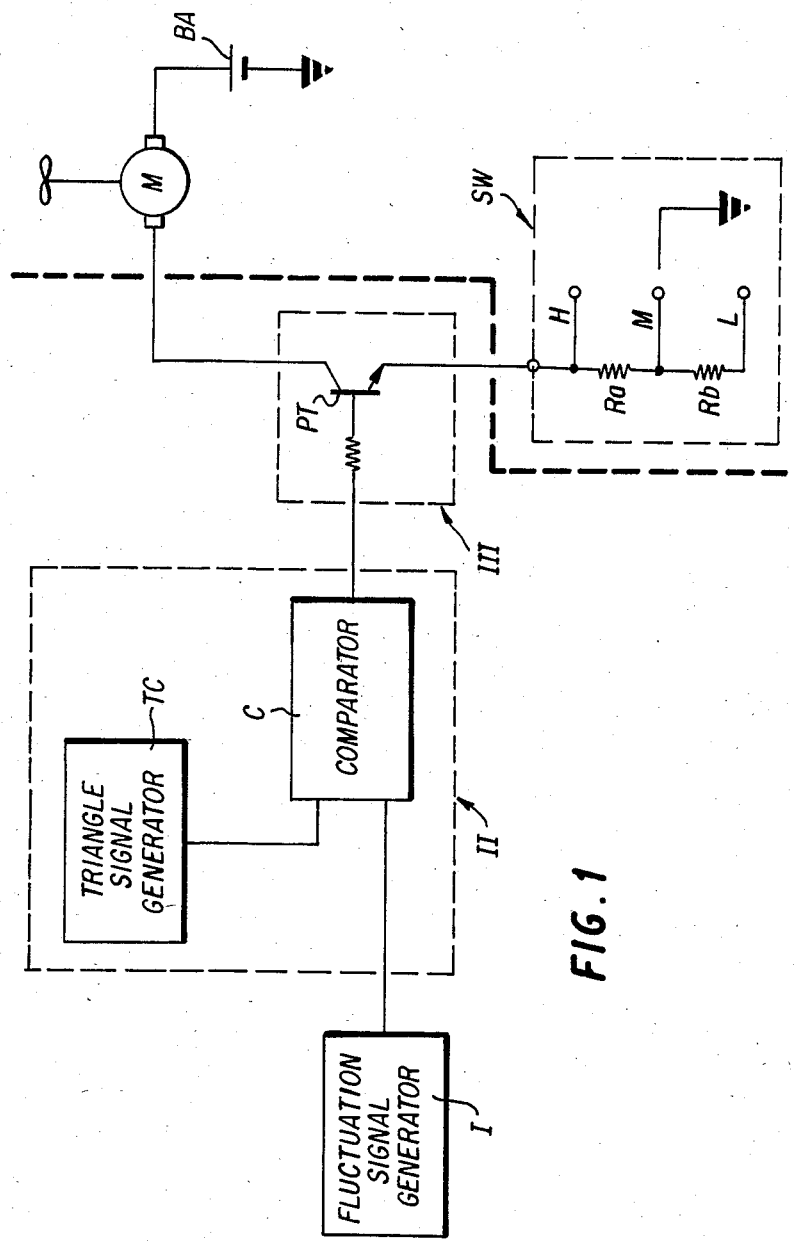
FIG. 1 is a block circuit diagram of an automobile fan controller according to a first embodiment of the present invention.

As illustrated in FIG. 1, an automobile fan controller according to a first embodiment of the present invention comprises a random fluctuation signal generator I for generating a random fluctuation signal, a pulse-width-modulation circuit II composed of a triangle signal generator TC for generating a triangle-waveform signal having a constant amplitude and a constant period and a comparator C connected to the random fluctuation signal generator I and the triangle signal generator TC, and driver circuit III composed of a switching power transistor PT having a base connected to the pulse-width-modulation circuit II, a collector connected to an automobile fan motor M, and an emitter joined to an air flow switching unit SW.

The automobile fan controller of the first embodiment switches on and off the switching power transistor PT under the control of the duty cycle of a pulse signal which is modulated in its pulse width that is determined by the random fluctuation signal and the triangle-waveform signal. Due to its time delay characteristics, the motor M rotates at various revolutions per minute dependent on the duty cycle of the pulse signal to control the flow of air from an ordinary automobile fan in an randomly fluctuating manner. The width of fluctuation is determined by an air flow level selected by the driver.

According to the automobile fan controller of the first embodiment, the motor M is controlled by switching on and off the switching power transistor PT and thus is kept in operation while either the current flowing through or the voltage applied to the switching power transistor PT is zero. Therefore, the automobile fan controller consumes smaller electric power than an analog control system requiring continued electric power consumption, and the transistor used may be of a smaller capacity.

The air flow switching unit SW of the automobile fan controller according to a first embodiment has range-selection resistors for setting air flow levels as with conventional automobile fan controllers. When the flow of air from the fan is small, or a large resistor is connected, the current which flows through the switching power transistor PT and hence the electric power consumed thereby are small.

Figure 2:
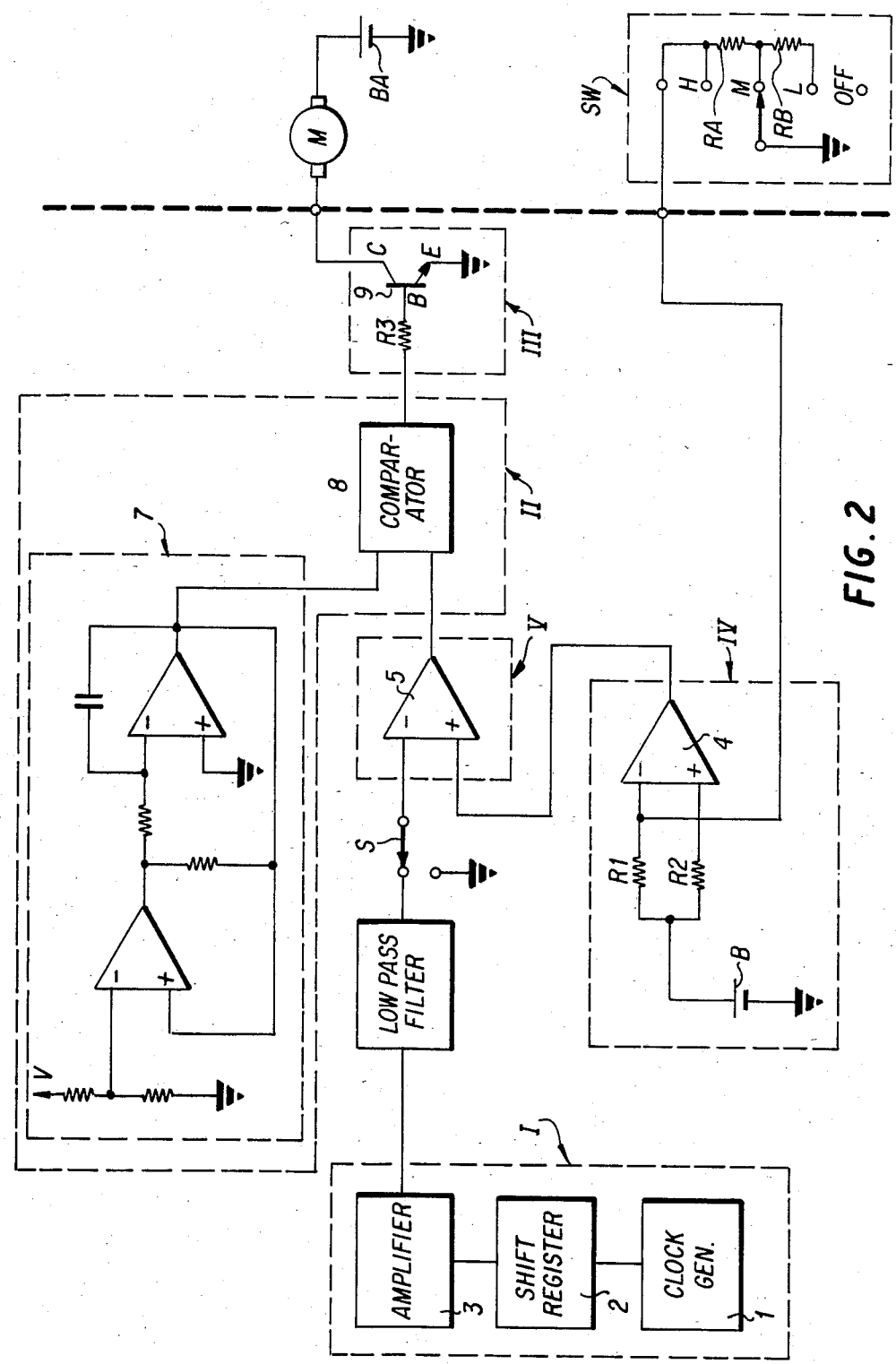
FIG. 2 is a block circuit diagram of an automobile fan controller according to a second embodiment of the present invention.

As shown in FIG. 2, an automobile fan controller according to a second embodiment comprises a random fluctuation signal generator I for generationg a 1/f randomly fluctuation signal, a range detector IV connected to fan-range-selection resistors for detecting a set range to produce a corresponding range signal, a subtractor V for subtracting the randomly fluctuation signal from the range signal a pulse width modulation circuit II composed of a triangle signal generator 7 and a comparator 8 for generating a pulse signal having a variable pulse width by comparing a difference signal issued by the subtractor V with a triangle-waveform signal issued by the triangle generator 7, and a driver III composed of a switching power transistor 9 connected to an automobile fan motor and energized or de-energized by the variable-pulse-width signal produced by the pulse-width-modulation circuit II.

Figure 6A:
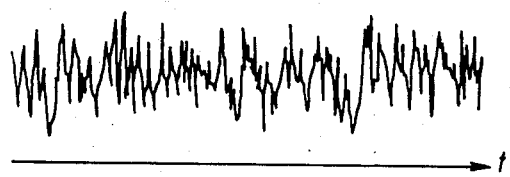
FIGS. 6a and 6b show random noise wave forms from the random noise generator.
Figure 6B:
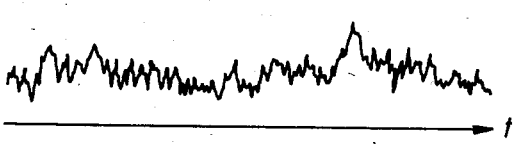

FIGS. 6a and 6b show random noise fluctuation with respect to the output of the random noise generator.

Figure 7A:
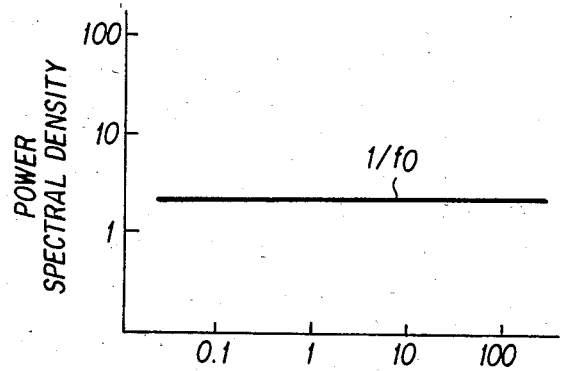
FIGS. 7a and 7b show fluctuations of $1/f^0$ and $1/f$ noise characteristics as shown from the respective 6a and 6b Figures.
Figure 7B:
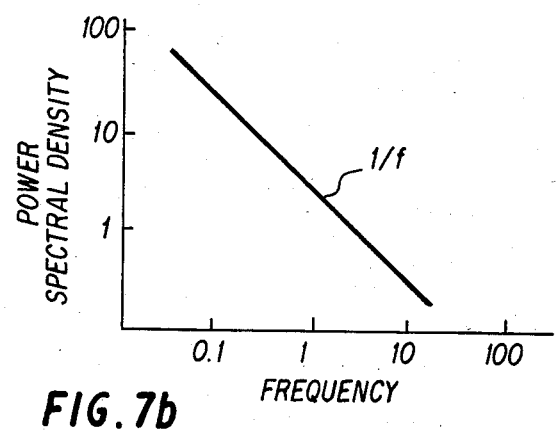

FIGS. 7a and 7b show the characteristics of the 1/f filter at various settings. Specifically, FIG. 7(b) shows the fluctuation of 1/f noise characteristics as shown in FIG. 6b which have their power spectral density inversely proportional to the frequency f, which fluctuations will be hereinafter referred to as "random fluctuations having 1/f characteristics." The random fluctuations having 1/f charcteristics (or the fluctuations of 1/f noise characteristics) have such properties that the present condition has a relationship with the near past condition but not with the distant pass condition and the present conditions exerts the influence on the short future condition but not upon the far future conditions. In short, with regard to random fluctuations of this kind, one can predict to a slight extent the future condition however, the level prediction is not high.

Figure 5:
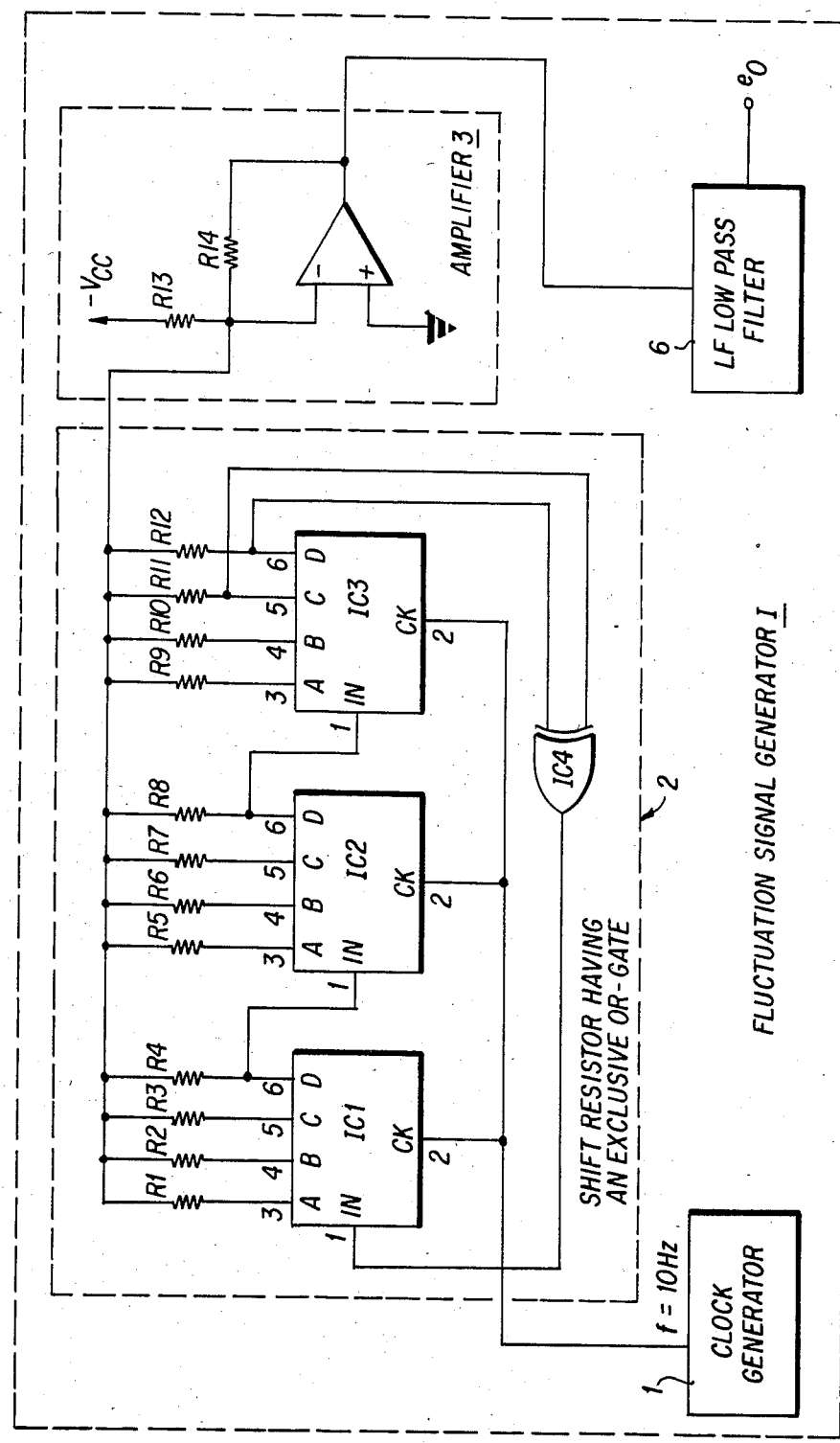
FIG. 5 is a detailed schematic of the random fluctuation signal generator.

The random fluctuation signal generator I includes a clock generator I for generating a clock signal of 10 Hz, a 12-bit shift registor 2 including an exclusive OR gate, an amplifier 3 for converting the random digital signal to the random analog signal, and low-pass filter having an attenuation characteristic of 1/f for producing the 1/f fluctuation signal. This can be more clearly seen from FIG. 5.

The clock signal generator 1 generates a pulse signal of about 10 Hz.

IC1, IC2 and IC3 are the shift registers to 2 of 4 bits respectively. When the pulse is outputted from the clock signal generator, the signal inputted from the input terminal 1 of the shift register IC1 is shifted from the terminal 3 to terminal 4 of the shift register IC1. The same shifts occur from the terminal 3 of the shift register IC1 to the terminal 6 of the shift register IC3 respectively and successively. The signal from the terminal 5 and 6 of the shift register IC3 is given to the exclusive OR IC4 by the shift register and this output is supplied to the input terminal 1 of the shift register IC1. The shift registers IC1, IC2 and IC3 output the random digital signal. The amplifier 3 converts the random digital signal to a random analog signal. A low pass filter having a continuation characteristic of 1/f comprises multi-stage cascade connection of units comprising a low pass filter, a high pass filter and a continuation circuit which converts the random digital signal to a 1/f fluctuation signal.

The range detector IV comprises a differential-type operational amplifier 4, a DC power supply B having one terminal grounded, a resistor R1 connected between the DC power supply B and a negative input terminal of the differential amplifier 4, and a resistor R2 connected between the DC power supply B and a positive input terminal of the differential amplifier 4. The negative input terminal of the differential amplifier 4 is connected to one terminal of a series of resistors RA and RB in fan-range-selection. As a higher range for the flow of air blown by the automobile fan is selected, the potential at the negative input terminal of the differential amplifier 4 becomes lower. Since the positive input terminal of the differential amplifier 4 is maintained at a constant potential, the net reuslt is that the differential amplifier 4 produces a range signal of a voltage level which becomes higher when the driver selects a higher range of air flow.

The subtractor V comprises a differential amplifier 5 having a negative input terminal connected to the fluctuation signal generator I through a changeover switch S and a 1/60 Hz low-pass filter 6 and a positive input terminal connected to the range detector IV for subtracting the fluctuation signal from the range signal to produce a difference signal.

The pulse-width-modulation circuit II has the triangle signal generator 7 and the comparator 8, the triangle signal generator 7, including an integrator and a comparator, issues a triangle-waveform signal having a frequency of a few KHz. The comparator 8 has one input terminal joined to the subtractor V and the other end to the triangle signal generator 7 and produces a signal of a variable pulse width only when the difference signal is greater than the triangle-waveform signal.

The switching power transistor 9 of the driver III has a base connected to the comparator 8 via a resistor R3 which determines a base current, a collector connected to a terminal of the fan motor M, and an emitter grounded. When a pulse signal is applied to the base of the switching power transistor 9, the latter is turned on and continues to be energized as long as the pulse signal is supplied to the base of the transistor 9 for thereby allowing an electric current to flow from an automobile-mounted battery BA to drive the motor M.

Figure 3:
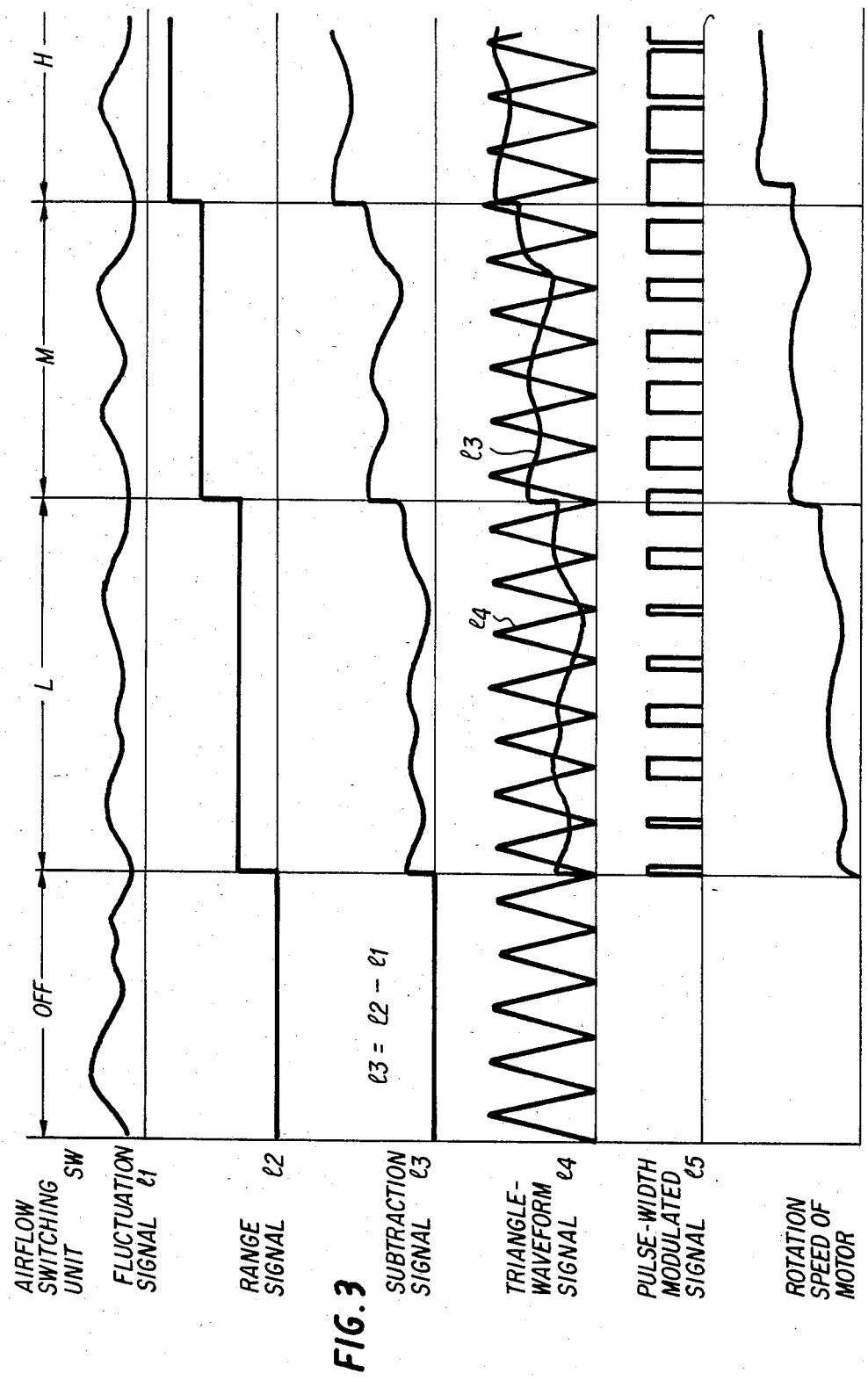
FIG. 3 is a waveform diagram of the various signals inherent in each stage of FIG. 2 with switch S in the fluctuation position (i.e. first position).
Figure 4:
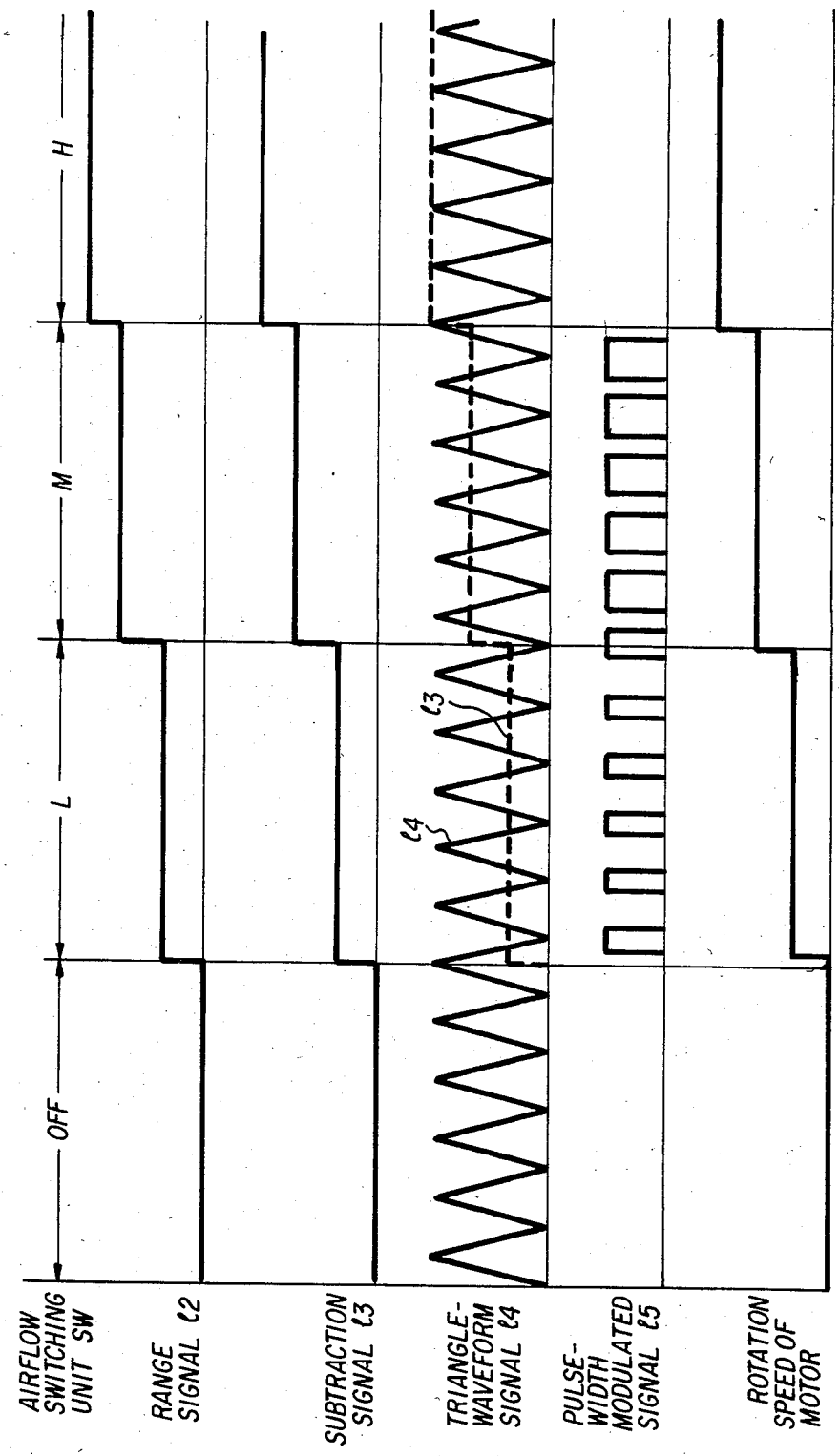
FIG. 4 is a waveform diagram of the various signals inherent in each stage of FIG. 2 with switch S in the non-fluctuation position (i.e. position 2).

FIG. 3 shows the waveforms that occur at various stages in this circuit. The top waveform is a fluctuation signal coming from the randomly fluctuating signal generator. The second waveform is a signal produced by the range signal setting means. The third waveform is the subtraction or difference signal. The bottom waveform indicates the rotational speed of the fan motor based on the random signal generator. FIG. 4 represents the waveforms of the same circuit when the changeover switch is in the second position (i.e. no fluctuation signal).

The automobile fan controller of the second embodiment operates by detecting an air flow range set by the driver with the range detector IV so as to drive the fan motor to deliver air which randomly fluctuates at a constant fluctuation period regardless of the air flow range set by the driver. The automobile fan controller according to the second embodiment is also as advantageous as the automobile fan controller of the first embodiment.

What is claimed is:

1. An automobile fan controller comprising
a fluctuation signal generator for generating a random fluctuation signal,
a pulse-width-modulation circuit including
a triangle signal generator for generating a triangle-waveform signal having a constant amplitude and a constant period, and
a comparator connected to said fluctuation signal generator and said triangle signal generator, for comparing the fluctuation signal with the triangle-waveform signal,
thereby producing a pulse signal having a pulse width variable dependent on the fluctuation signal, and
a driver circuit, including a switching power transistor connected to said pulse-width-modulation circuit, a fan motor mounted on an antomobile, and an air flow switching unit mounted on the automobile, for energizing and de-energizing said fan motor with a variable pulse width in response to the pulse signal,
whereby air flow delivered from an automobile fan driven by said fan motor can fluctuate at a fluctuation amplitude in response to an air flow range set by an automobile driver by connecting the automobile fan controller to said fan motor.

2. An automobile fan controller according to claim 1, wherein
said fluctuation signal generator comprises
a clock generator for generating a clock signal of a predetermined frequency,
a shift register connected to said clock generator, and
an amplifier, connected to said shift register, for producing a 1/f fluctuation signal.

3. An automobile fan controller according to claim 2, wherein
said triangle signal generator of said pulse-width modulation circuit comprises an integrator and a comparator connected to said integrator, and
said comparator of said pulse-width modulation circuit is connected to said amplifier of said fluctuation signal generator and said triangle signal generator thereof.

4. An automobile fan controller according to claim 3, wherein
said driver circuit comprises an input resistor connected to said comparator of said pulse-width modulation circuit, and a switching power transistor, a base of which is connected to said input resistor, a collector of which is connected to said fan motor and an emitter of which is connected to said air flow switching unit.

5. An automobile fan controller according to claim 3, further comprising
a range detector comprising a differential-type operational amplifier, a DC power supply having one terminal grounded, a first resistor connected between said DC power supply and a negative input terminal of said differential amplifier, and a second resistor connected between said DC power supply and a positive input terminal of said differential amplifier, said negative input terminal of said differential amplifier being connected to resistors of said air flow switching unit.

6. An automobile fan controller according to claim 5, further comprising,
a subtractor comprising a differential amplifier having a negative input terminal connected to said fluctuation signal generator through a changeover switch and a 1/60 Hz low-poss filter and a positive input terminal connected to said range detector, thereby subtracting the fluctuation signal from the range signal to produce a subtraction signal.

7. An automobile fan controller according to claim 6, wherein
said comparator of said pulse-width modulation circuit is connected to said subtractor,
said driver circuit comprises an input resistor connected to said comparator of said pulse width modulation circuit and a switching power transistor, a base of which is connected to said input resistor, a collector of which is connected to said fan motor and an emitter of which is connected to the earth.

8. An automobile fan controller according to claim 1, further comprising:
a range detector means connected to said air flow switching unit for detecting the range set and for supplying a range signal, and
a subtractor interposed between said fluctuation signal generator and said comparator of said pulse-width modulation circuit and connected to said range detector means, for subtracting the fluctuating signal which fluctuates in the predetermined amplitude range from the range signal, and generating a subtracting signal with same amplitude range, and wherein;
said comparator for comparing a triangle-waveform signal and producing the pulse-width modulation signal which has the predetermined amplitude range in response to that of fluctuation signal and the center of said amplitude is set to be the value in response to the range-signal,
an emitter terminal of said power transistor is connected to the earth,
whereby air flow delivered from an automobile fan driven by said fan motor can fluctuate in a predetermined fluctuation amplitude range in response to a fluctuation signal, and the center of the fluctuation amplitude is set to be the value in response to the flow level set.

* * * * *